June 16, 1964
L. H. BILLEY
3,137,553
MEANS TO ASPIRATE DUST FROM AN AIR CLEANER
Filed June 20, 1962
2 Sheets-Sheet 2
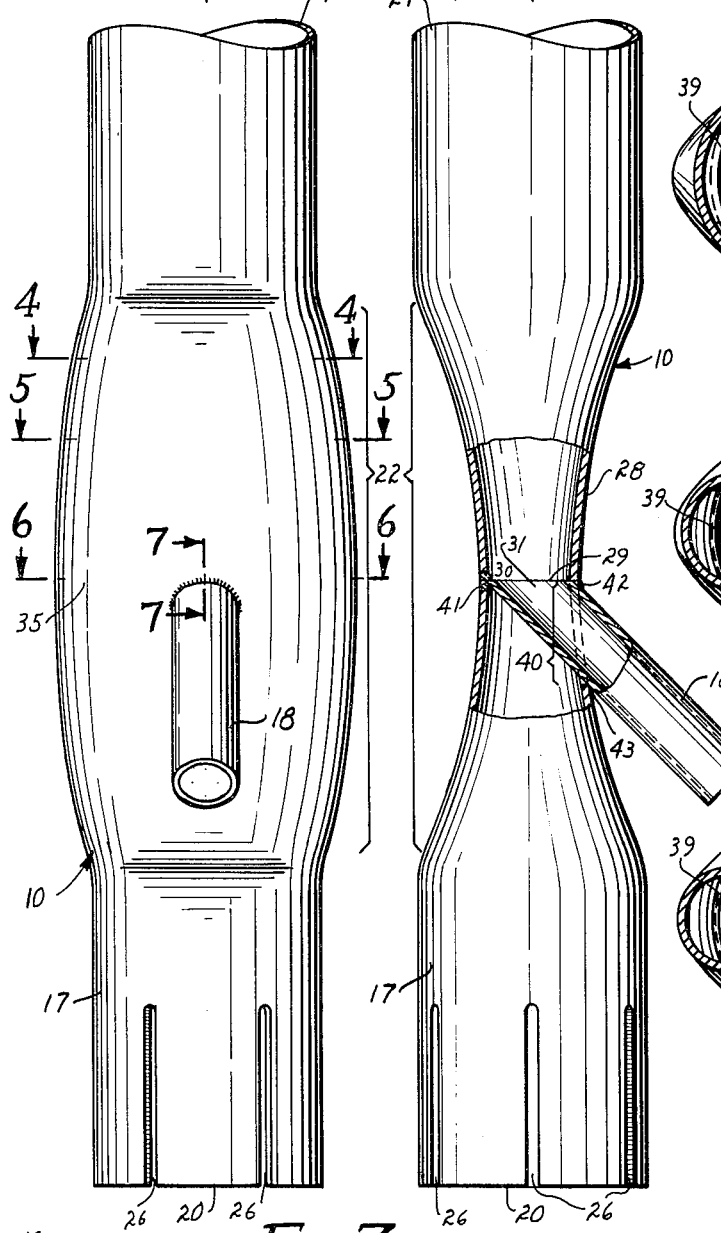
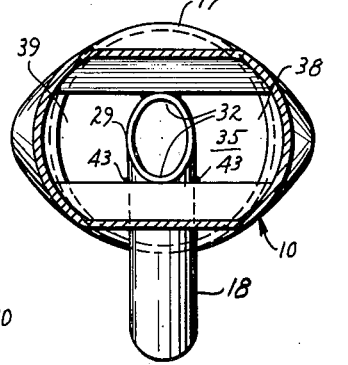
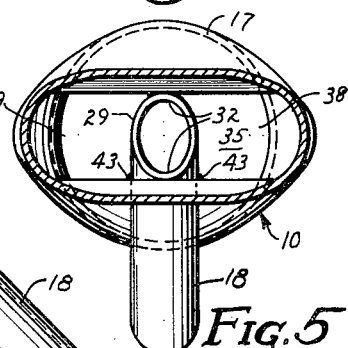
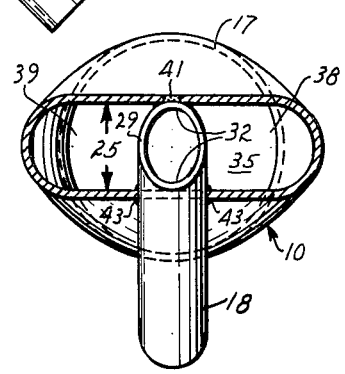
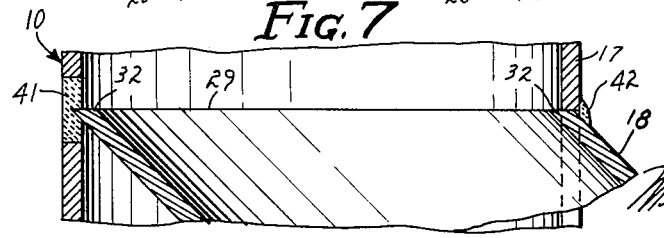
INVENTOR.
LEINO H. BILLEY
BY
*Merchant, Merchant & Gould*
ATTORNEYS

3,137,553
MEANS TO ASPIRATE DUST FROM AN AIR CLEANER
Leino H. Billey, Minneapolis, Minn., assignor to Donaldson Company, Inc., Minneapolis, Minn., a corporation of Delaware
Filed June 20, 1962, Ser. No. 203,989
1 Claim. (Cl. 55—431)

This invention relates to a new and very useful simple means for using internal combustion engine exhaust gas to aspirate dust from an air cleaner.

Heretofore, the art has commonly employed venturi tubes or nozzles within a throat, following the practice in steam injectors and air aspirators, in constructing exhaust aspirators. While such constructions can be made quite effective for the purpose intended, they usually require exact construction and close tolerances. By the present invention, there is provided a different construction which is simple to make but very effective for aspirating dust into exhaust gases from air cleaners of the type wherein dust and other particles separated from air are induced to collect at a predetermined situs within the air cleaner.

More particularly, this invention relates to a construction useful for continuously withdrawing dust from the dust chamber of an air cleaner associated with an engine using exhaust gases from the same engine for aspiration. The aspiration is dependent upon the velocity of engine exhaust gases. The device utilizes an exhaust conduit receiving exhaust gases from an internal combustion engine and exhausting the same to the atmosphere, said exhaust conduit having a midregion which is generally flattened from opposite end regions to a midpoint of maximum restriction, whose cross-section is generally oval in shape. A dust conduit is connected with the dust chamber of the air cleaner and ends in the region of maximum restriction in said exhaust conduit, such dust conduit having an end formed into an oblique angle with respect to such dust conduit's axis.

Still more particularly, this invention relates to an exhaust aspirator comprising two essential components. One of these is an engine exhaust conduit and has the form of a generally straight length of tube whose ends are generally circular in cross-section but whose midregion is generally flattened. The appearance of the flattened region corresponds generally to that of a pair of opposed concave surfaces whose respective radii generally match that of each of a pair of cylinders, whose respective axes are positioned generally normally to the axis of said tube and are generally parallel to each other. These cylinders have diameters substantially greater than that of the end regions of said tube, but less than the length of said tube. The midregion of the tube is flattened to an extent such that the shortest distance between interior walls of said tube at the point of maximum restriction is not greater than about one-half the diameter of an end of said tube. The second component is also a length of tube which is generally straight and has a generally uniform circular cross-section. Its diameter is generally less than the shortest distance between walls at the point of maximum restriction of said first tube. This second tube has one end cut off at an oblique angle with respect to the second tube's axis. The maximum distance between said second tube's walls at such obliquely cut end is approximately equal to the shortest distance between walls at the point of maximum restriction of the first tube. The second tube is so positioned with respect to the first tube that the obliquely cut end of the second tube extends between the shortest distance between walls of the first tube at the point of maximum restriction of said first tube's walls, and the axis of said first tube approximately intersects the axis of said second tube. A suitable, generally elliptically shaped, orifice is provided in the wall of said first tube for the reception of said second tube.

It is an object of this invention to provide a simple, effective exhaust aspirator construction.

It is another object of this invention to provide an exhaust aspirator utilizing a flattened exhaust conduit.

It is another object of this invention to provide an economical construction useful as an exhaust aspirator for continuously withdrawing dust from the dust chamber of an air cleaner which can be readily utilized in combination with conventional internal combustion engines.

Other and further objects will become apparent to those skilled in the art upon a reading of the present specification.

The invention is better understood by reference to the drawings, in which:

FIG. 2 is a view in side elevation showing the exhaust aspirator construction of FIG. 1;

FIG. 3 is a view in side elevation of the same construction as shown in FIG. 2 taken at right angles to the view in FIG. 2;

FIG. 4 is a horizontal sectional view of the apparatus of FIG. 2 taken along the line 4—4 of FIG. 2;

FIG. 5 is a horizontal sectional view of the apparatus of FIG. 2 taken along the line 5—5 of FIG. 2;

FIG. 6 is a horizontal sectional view of the apparatus of FIG. 2 taken along the line 6—6 of FIG. 2; and FIG. 7 is an enlarged horizontal sectional view of the apparatus of FIG. 2 taken along the line 7—7.

Figure 1:
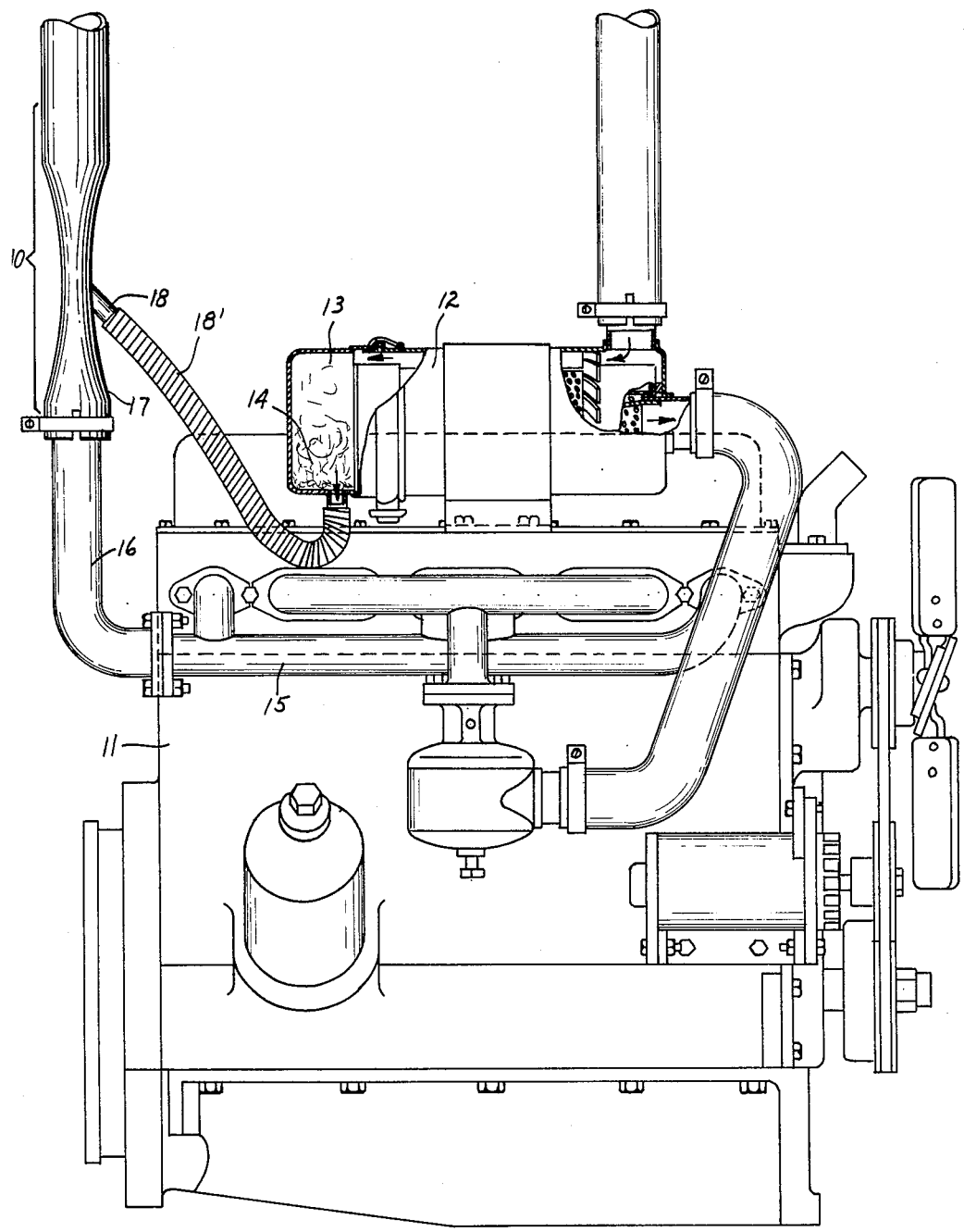
FIG. 1 is a plan view showing an embodiment of the invention being used with an internal combustion engine to aspirate dust from the dust chamber of an air cleaner associated with the same engine.

In FIG. 1 is shown a manner of using an embodiment 10 of the invention in combination with an internal combustion engine 11 utilizing an air cleaner 12 of the type from which dust 14 can continuously be withdrawn from a dust chamber 13. Exhaust manifold 15 feeds an exhaust pipe 16. Exhaust pipe 16, in turn, feeds exhaust conduit 17. A flexible hose 18' interconnects dust chamber 13 with conduit 18. As exhaust exits from the engine, suction is created in the region of maximum restriction 35 of tube 17 which draws dust from the dust chamber 13 into the exhaust stream passing through conduit 17.

FIGS. 2 and 3 show the structure of the exhaust aspirator of FIG. 1. Exhaust conduit 17 is a generally straight length of tube whose ends 20 and 21, respectively, are generally circular in cross-section. The midregion 22, however, is generally flattened in a particular manner. It is as though the flattening had been achieved by a bending action derived from a pair of generally matching cylinders (not shown) which are positioned normally to the axis of said tube. These cylinders have generally parallel respective axes and have diameters substantially greater than that of the end regions of said tube 17. However, the diameter of these cylinders is less than the length of tube 17.

In general, the extent to which tube 17 is flattened is such that the shortest distance between interior walls of tube 17 at the point of maximum restriction (designated by the number 25 in FIG. 6) is not greater than about one-half the diameter of an end of tube 17.

Those skilled in the art will appreciate that as a practical matter, a metallic tube having a circular cross-section can be physically bent in the manner described for use in constructions of this invention by using conventional tube-bending techniques. In practice, however, any suitable means may be employed to achieve the shape desired.

As a matter of convenience, tube 17 can be provided in its bottom end 20 with slots 26 so as to provide an inlet sleeve to aid in connecting conduit 17 with pipe 16 (see FIG. 1).

Thus, tube 17 has a midregion which has been expanded when looked at from the elevational view of FIG. 2, or compacted when looked at from the elevational view of FIG. 3. One can term the arcuate side wall 28 in the flattened concave midregion the "radius of squash"; this measurement can vary over an indefinitely wide range, without functionally interfering with the invention nor departing from its spirit and scope. Indeed, it has been found that a single radius can be used for many different sizes and capacities of exhaust aspirator units made within the teachings of this invention.

Conduit 18, like conduit 17, is generally straight. It is also generally circular in cross-section. In general, however, the diameter of conduit 18 is less than the shortest distance 25 between walls of tube 17 at the point of maximum restriction 35 within tube 17. One end 29 of conduit 18 is cut off at an oblique angle 30 with respect to the axis 31 of tube 18. The maximum distance 32 between tube 18's walls at obliquely cut end 29 is approximately equal to the shortest distance 25 between walls at the point of maximum restriction 35 of tube 17. Like conduit or tube 17, conduit or tube 18 can be of any conventional material of construction, though, of course, metals are preferred.

Tube 18 is so positioned with respect to tube 17 that the obliquely cut end 29 of tube 18 extends between the shortest distance 25 at the point of maximum restriction 35 in the walls of the tube 17. Also, the positioning of the two tubes with respect to one another is such that the axis of tube 18 intersects the axis of tube 17; in other words, tube 18 is centrally positioned in the region 22. Such positioning appears to aid in maximizing the aspiration efficiency of the construction of this invention. Tube 18, thus being so positioned in the middle of tube 17, provides for an approximately equal flow of exhaust gases through the spaces 38 and 39, respectively, on either side of the end 29 within tube 17.

In order to position the end 29 of tube 18 within tube 17 as described, it is, of course, necessary that there be a suitable, generally elliptically shaped orifice 40 in the wall of tube 17 for the reception of tube 18.

No particular means of securing tube 18 to tube 17 need be employed, but it has been found convenient to have a small hole 41 positioned in the wall of tube 17, centrally, opposite orifice 40 at the point of the shortest distance between the walls at the point of maximum restriction 35 of tube 17. Then, when tube 18 is inserted as described through orifice 40, the nozzle or end 29 can be positioned or located without the use of auxiliary jigs. Furthermore, once tube 18 is in position, hole 41 provides a convenient aperture for plug welding tube 18 to tube 17. Such plug welding also appears to prevent the flattened tube 17 from returning to a larger (undesired) cross-sectional area. Additionally, if desired, tube 18 can be fastened to tube 17 by means of spot welds at 42 and 43.

The entire assembly 10 is conveniently used by merely replacing existing stack assemblies on internal combustion engines. For this reason, it is convenient suitably to vary the over-all length of pipe, tube or conduit 17 in order to match the requirements involved in a particular installation.

While the foregoing description has been given largely in reference to the particular embodiment shown in the figures, it will be appreciated by those skilled in the art that other and equivalent constructions are possible from the foregoing teachings, and it is not intended that the scope of this invention is to be limited to the embodiment shown and described.

The claim is:

Aspirating means for an internal combustion engine having an air cleaner including a dust chamber and an exhaust manifold associated therewith, (a) first conduit means associated with said exhaust manifold, (b) said first conduit means having generally cylindrical opposite end portions and having a midregion in which the opposite side walls are generally flattened to define a generally ovate throat, and (c) a second conduit means having a generally cylindrical cross section and having diametrical dimensions considerably less than the major transverse dimension of said throat, (d) one end of said second-mentioned conduit means being connected with the dust chamber of said air cleaner and the other end thereof entering said first-mentioned conduit means through one of said flattened side walls with the respective axes of said conduit means intersecting each other at an acute angle, (e) said last-mentioned conduit means terminating within said throat in a mouth the plane of which is generally normal to the axis of said first conduit means and which opens in a downstream direction with respect to the gases passing through said first conduit means.

(f) said second-mentioned conduit means adjacent said mouth bridging said flattened throat-defining side walls and being rigidly secured to each thereof.

References Cited in the file of this patent
UNITED STATES PATENTS

| | | |
|---|---|---|
| 1,496,908 | Schutz | June 10, 1924 |
| 1,530,645 | Brockway | Mar. 24, 1925 |
| 2,391,863 | Bowen | Jan. 1, 1946 |